United States Patent [19]

Kempter et al.

[11] Patent Number: 4,777,194

[45] Date of Patent: Oct. 11, 1988

[54] HEAT-CURABLE COATING AGENT, AND CATHODIC ELECTROCOATING

[75] Inventors: Fritz E. Kempter, Mannheim; Juergen Nieberle, Wachenheim; Eberhard Schupp, Schwetzingen, all of Fed. Rep. of Germany

[73] Assignee: BASF Aktiengesellschaft, Ludwigshafen, Fed. Rep. of Germany

[21] Appl. No.: 744,204

[22] Filed: Jun. 13, 1985

[30] Foreign Application Priority Data

Jun. 16, 1984 [DE] Fed. Rep. of Germany ....... 3422474

[51] Int. Cl.$^4$ .............................................. C08L 63/00
[52] U.S. Cl. .................................... 523/414; 523/420; 525/484
[58] Field of Search ................. 523/414, 420; 525/484

[56] References Cited

U.S. PATENT DOCUMENTS

| | | | |
|---|---|---|---|
| 3,485,797 | 12/1969 | Robins et al. | 260/57 |
| 3,896,017 | 7/1975 | Sekmakas | 204/181.7 |
| 4,001,156 | 1/1977 | Bosso et al. | 260/29.2 EP |
| 4,120,847 | 10/1978 | Culbertson et al. | 528/140 |
| 4,157,324 | 6/1979 | Culbertson et al. | 524/361 |
| 4,212,779 | 7/1980 | Schmolzer et al. | 260/22 |
| 4,260,716 | 4/1981 | Christenson et al. | 528/45 |
| 4,260,720 | 4/1981 | Bosso et al. | 528/109 |
| 4,291,147 | 9/1981 | Kempter et al. | 528/119 |
| 4,310,646 | 1/1982 | Kempter et al. | 525/528 |
| 4,315,044 | 2/1982 | Elmore et al. | 523/414 |
| 4,315,840 | 2/1982 | Kempter et al. | 260/18 |
| 4,339,369 | 7/1982 | Hicks et al. | 523/414 |
| 4,373,072 | 2/1983 | Patzschke et al. | 525/438 |
| 4,376,848 | 3/1983 | Subramanyam et al. | 525/452 |
| 4,433,080 | 2/1984 | Laganis et al. | 523/414 |
| 4,442,247 | 4/1984 | Ishikura et al. | 523/414 |
| 4,446,260 | 5/1984 | Woods et al. | 523/414 |
| 4,454,265 | 6/1984 | Tortorello et al. | 523/414 |
| 4,481,311 | 11/1984 | Hesse et al. | 523/424 |
| 4,524,161 | 6/1985 | Feuerhahn | 523/414 |
| 4,568,709 | 2/1986 | Paar et al. | 523/414 |
| 4,575,523 | 3/1986 | Anderson et al. | 523/414 |
| 4,600,737 | 7/1986 | Georgalas et al. | 523/414 |

FOREIGN PATENT DOCUMENTS

| | | | |
|---|---|---|---|
| 0012463 | 11/1979 | European Pat. Off. | |
| 0051297 | 5/1982 | European Pat. Off. | 523/414 |
| 0077221 | 4/1983 | European Pat. Off. | 523/414 |
| 2440113 | 2/1975 | Fed. Rep. of Germany | 523/414 |
| 1303480 | 1/1973 | United Kingdom | |
| 1302801 | 1/1973 | United Kingdom | |
| 1391922 | 4/1975 | United Kingdom | 523/414 |
| 1461823 | 1/1977 | United Kingdom | |
| 1553036 | 9/1979 | United Kingdom | |
| 2050381 | 1/1981 | United Kingdom | |

Primary Examiner—Joseph L. Schofer
Assistant Examiner—J. M. Reddick
Attorney, Agent, or Firm—Keil & Weinkauf

[57] ABSTRACT

A heat-curable aqueous coating agent contains, as a binder, a mixture or precondensate of (A) a resin possessing basic nitrogen groups and
(B) a phenol resin based on a resol ether which is bonded via 0,0'-methylene ether groups and whose p-positions predominantly carry hydrogen and/or methylolalkyl ether groups.

After protonation with an acid, the said coating agent is particularly useful as a binder for the cathodic electrocoating of metal articles.

8 Claims, No Drawings

HEAT-CURABLE COATING AGENT, AND CATHODIC ELECTROCOATING

The present invention relates to heat-curable coating agents and their use for coating substrates, in particular electrically conductive substrates by cathodic electrocoating.

German Laid-Open Application DOS No. 2,737,375 describes reaction products of polyepoxy resins with polyamines, which are reacted with not less than 2 moles, per mole of the adduct, of a monoepoxide or of a $C_8$–$C_{24}$-monocarboxylic acid. Monoepoxides are preferred. The crosslinking agents used are amino resins and phenol resins, and the stated baking conditions are 30 minutes at 190° C.

German Laid-Open Application DOS No. 2,426,996, too, describes cathodic coating baths prepared from reaction products of a diepoxy resin with polyfunctional and monofunctional amines, the polyfunctional amines acting as coupling agents and the monofunctional amines as terminators. The crosslinking agents used are likewise phenol resins.

German Laid-Open Application DOS No. 3,014,290 discloses epoxy resin/amine adducts which are copolymerized with monoacrylates, the comonomer mentioned being acrylic acid. The products are precondensed with, inter alia, a phenol resin.

German Laid-Open Application DOS No. 2,936,411 describes self-crosslinking heat-curable aqueous coating agents which contain synthetic resins which possess primary and/or secondary and, if appropriate, tertiary amino groups, and terminal esterified carboxyl groups. Some of the examples mention the concomitant use of commercial phenol resins.

German Laid-Open Application DOS No. 2,805,936 discloses carboxyl-containing cationic binders and binder combinations. The crosslinking agents used are amino resins and phenol resins which, if they are water-insoluble, are precondensed with the binder.

The use of phenol resins for curing cathodic electrocoating binders is therefore known, the conventional, preferably etherified phenol resins being obtained by methylolation at an alkaline pH. Starting from phenol, reaction takes place preferentially at the p-position, which is consumed in the formation of the oligomeric or polymeric resin. Hence, in the case of conventional phenol resins, the reactive p-position is available only to a minor extent, if at all, and is not available at all where precondensed phenols, such as bisphenol A, are employed. Methylolation at an acid pH gives only a low yield when carried out at conventional temperatures and under atmospheric pressure. At high temperatures, novolaks are obtained.

It is an object of the present invention to provide coating agents which require lower curing temperatures than those conventionally employed at present and can preferably be cured completely at 130°–170° C., particularly preferably 140°–160°.

It is a further object of the present invention to keep to a minimum the amount of substances eliminated from the binder during curing.

Furthermore, the shelf life and bath stability of the coating agents should meet practical requirements.

We have found that this object is achieved by heat-curable aqueous coating agents which contain, as a binder, a mixture or precondensate of (A) a resin possessing basic nitrogen groups and (B) a phenol resin based on a resol ether which is bonded via, o,o'-methylene ether groups and whose p-positions predominantly carry hydrogen or methylolalkyl ether groups or both hydrogen and methylolalkyl ether groups.

Component (A) preferably has an NH amine number of 20–150 mg of KOH/g, and phenol-phenol bonds of component (B) preferably consists of 15–90% of methylene ether bridges and 10–85% of methylene bridges, 70–90% of which are in the o-position and 10–30% of which are in the p-position.

Furthermore, a preferred component (B) is a reaction product of phenol and formaldehyde and, if appropriate, an aliphatic alcohol, this product being prepared at pH 4.0–7.0 in the presence of divalent metal ions.

The novel binder preferably consists of a mixture or precondensate of 55–95% by weight of component (A) and 5–45% by weight of component (B).

The present invention furthermore relates to a process for the cathodic electrocoating of metal articles, wherein the novel coating agents are employed in protonated form.

Surprisingly, the above aims can be attained in a very advantageous manner by the coating agents according to the invention.

Compared with the coating agents of the abovementioned prior art, the novel binders are distinguished in particular in that they can be baked at temperatures lower than the conventional curing temperatures, ie. at 130°–160° C., and the coatings exhibit excellent corrosion protection properties, even as very thin layers, and good throwing power.

Regarding the components of the novel coating agents or binders, the following may be stated specifically.

(A) Suitable resins (A) possessing basic nitrogen groups are in general polyadducts, polycondensates or polymers which contain basic nitrogen groups, have a mean molecular weight of $\overline{M}_n$ of from 500 to 10,000 and can be selected from a large number of hydroxyl-containing polymers, for example polyester resins, polyacrylates and polymers which are derived from epoxy resins, in particular those which contain some or all of the basic nitrogen groups in the form of NH groups, ie. primary or secondary amino groups. Preferred products are those having an NH amine number of 20–150 mg of KOH/g, particularly preferably those having a high content of secondary amino- -hydroxy-alkyl groups and an NH amine number of 30–130 mg of KOH/g.

Epoxy resin/amine adducts suitable as component (A) are NH-containing products in which the NH group can be a primary or secondary amino group.

Products of this type which possess primary amino groups are described in, for example, U.S. Pat. No. 3,947,339. They are obtained by reacting the epoxy resin with polyamines in which the primary amino groups are blocked by ketimine groups. When such products are used, and the components (A) and (B) are to be reacted with one another to give precondensates, in general some or all of the ketimine groups have to be subjected to hydrolytic cleavage before the reaction.

Products which contain not only primary amino groups but also secondary amino groups which carry a secondary OH group in the β-position are the reaction products of epoxy resins with polyamines or diamines, as described in German Laid-Open Applications DOS Nos. 2,737,375, 2,914,297, 3,008,810 and 2,805,936, German Pat. No. 2,845,988 and German Patent Application No. P 34 22 473.4 (O.Z. 0050/37172). Products having a similar composition are obtained by reaction with primary amines.

Examples of products which possess primary amino groups and secondary amino groups which carry a secondary OH group in the β-position are the reaction products of epoxy resins with ammonia, such epoxy resin/amine adducts being described in German Laid-Open Application DOS No. 2,914,297.

Suitable reactions for modifying the epoxide/amine adducts are, for example, the amide-forming reaction with mono- and dicarboxylic acids.

Examples of epoxy resins for the synthesis of the resins (A) which possess basic nitrogen groups and are employed according to the invention are polyepoxides which have a 1,2-epoxide equivalence greater than 1, preferably about 2 or more. Particularly preferred polyepoxides are those which are bifunctional in respect of the epoxide groups, di- and polyglycidyl ethers of polyphenols, such as bisphenol A, being very particularly preferred. Further examples of known polyepoxides of this type are described in, for example, U.S. Pat. No. 4,260,716, column 3, line 20, to column 4, line 30.

The resins (A) possessing basic nitrogen groups can also be prepared using other epoxide-containing polymers, for example acrylic polymers which contain epoxide groups. These polymers can be obtained, for example, by copolymerizing an unsaturated epoxide-containing monomer, such as glycidyl acrylate or methacrylate with one or more other polymerizable ethylenically unsaturated monomers. Examples of such polymers are described in U.S. Pat. No. 4,001,156, column 3, line 59, to column 5, line 60.

The reaction products of the polyepoxide and of the amine can be partially or completely neutralized with an acid, the resulting polymeric product containing amine salt and/or quaternary ammonium salt groups. The conditions for the reaction of the polyepoxides with amines, examples of various amines and their partial or complete neutralization with an acid are described in detail in U.S. Pat. No. 4,260,720, column 5, line 20, to column 7, line 4.

European Patent Application No. 0,012,463, too, describes various suitable polyepoxide/amine adducts.

In the reaction of the amine with the polyepoxide, the relative amount of these two components depends on the extent to which formation of cationic salt groups is desired, which in turn depends on the molecular weight of the polymer. The extent of formation of such groups, the molecular weight of the reaction product and, where relevant, the degree of conversion of components (A) and (B) should be chosen so that the mixture of the coating agent gives a stable dispersion in an aqueous medium.

A stable dispersion is one in which the dispersed phase does not settle out or, if a certain amount of sedimentation occurs, the material which has settled out can readily be dispersed again. Moreover, when used for electrocoating, the dispersion should be sufficiently cationic to permit an adequately high pH and conductivity of the bath to be achieved.

It is advantageous to control the molecular weight, the structure and the extent of formation of cationic salt groups so that the dispersed coating agent possesses the desired flow properties for forming a film on the substrate. Cathodic electrocoating involves the formation of a film on the cathode. The film should be insensitive to moisture to such an extent that it does not redissolve in the electrocoating bath and, after removal from the bath, does not become detached during washing of the coated surface.

In general, most of the cationic polymers in the novel coating materials have mean molecular weights of from about 500 to 10,000 and contain from 0.2 to 6, preferably from 0.5 to 3.5, particularly preferably from 1.0 to 2.5, milliequivalents of cationic groups per g of solids in the resin. Of course, the molecular weight and the cationic groups can be combined in such a way that a polymer having the desired properties is formed. As a rule, the polyglycidyl ethers have molecular weights of from 100 to 10,000, preferably from 500 to 5,000, whereas the acrylic polymers generally have higher molecular weights, eg. as high as 100,000, preferably from 5,000 to 50,000.

In addition to epoxy resins and resins derived from these, other hydroxyl-containing polymers, eg. polyester resins or hydroxyl-containing acrylic polymers, are also suitable. Examples of such polymers and their cationic derivatives which can be deposited electrolytically are described in British Pat. Nos. 1,303,080 (hydroxyl-containing acrylic polymers and polyesters) and 1,159,390 (hydroxyl-containing acrylic polymers).

(B) In the novel coating agent, the curing agent or cross-linking agent (B) is a phenol resin which is based on a resol ether which possesses two or more phenol radicals bonded in the o,o'-position by one or more methylene ether groups.

Products of this type are described in, for example, G.B. Pat. No. 1,302,801 and U.S. Pat. Nos. 3,485,797 and 4,120,847. In addition to this group, methylol and/or methylolalkyl ether groups may also be present. Particularly in products having a low content of methylene ether groups, any methylolalkyl ether groups incorporated in the p-position ensure good crosslinking at temperatures of $<160°$ C.

Depending on the molecular weight, products of component (B) having fairly high molecular weights contain, in addition to the methylene ether group, methylene bridges in the o,o'- or o,p-positions. The molecular weight of the crosslinking component (B) is in general from 250 to 2,500, a molecular weight of from 500 to 1,200, corresponding to an average degree of condensation of 4–9, being preferred. Products having a low degree of condensation are preferably used where precondensation with component (A) is carried out.

The component (B) can be represented roughly by the following formula:

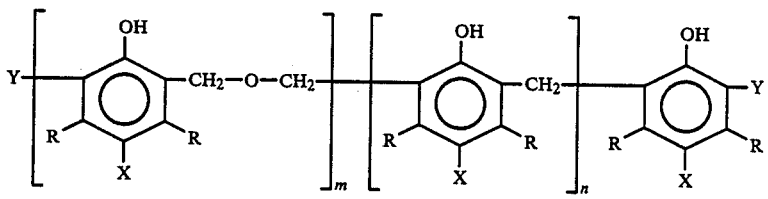

where X is H or a methylolalkyl ether group, where alkyl is of 1 to 12 carbon atoms, may contain not more than 2 OH groups and may or may not possess a phenyl or benzyl radical, and the higher alkyl groups may contain not more than 4 ether oxygen atoms, or X is a methylene bridge to another phenol nucleus, Y is H, $CH_2OH$ or a methylolalkyl ether radical of the type stated under X, R is H or alkyl of 1 to 15 carbon atoms, where the higher alkyl radicals may contain not more than 2 C—C double bonds, m is an integer from 1 to 9 and n is 0 or an integer from 1 to 10.

Component (B) possesses predominantly o,o'-bonded phenol nuclei which may or may not carry methylolalkyl ether groups in the p-position, component (B) being prepared using a catalyst which directs the reaction toward the o-position, generally a divalent metal cation.

This primary condensate contains o,o'-bonded methylene ether groups, which are very reactive.

Component (B) can be prepared by reacting phenol and formaldehyde in a molar ratio of about 1:3 in an aqueous or non-aqueous (eg. benzene) system, in the presence of a catalyst which directs the reaction toward the o-position, at pH 4.0-7.0 and 80°-110° C. Suitable catalysts are hydroxides, oxides and salts of divalent metals, eg. $Zn^{++}$, $Sn^{++}$, $Pb^{++}$, $Mg^{++}$, $Ca^{++}$, $Ba^{++}$ or $Co^{++}$, in an amount of 0.001-12%, preferably 0.01-8.0%, based on phenol employed, the salts being those of organic acids, eg. acetates, naphthenates, neodecanoates, benzoates, etc., and the lower range preferably being used for reaction in aprotic solvents. Any subsequent etherification of methylol groups still present is carried out using primary and secondary alcohols. Specific suitable compounds for this purpose are monoalcohols of 1 to 15 carbon atoms and polyhydric alcohols, eg. glycerol, trimethylolpropane, hexanediol, diethylene glycol and triethylene glycol, if appropriate as a mixture with the first-mentioned compounds.

Where more than 2-2.2 moles of formaldehyde are to be employed per mole of phenol, the addition of the formaldehyde or of the formaldehyde donor is carried out in 2 or more stages, ie. is repeated during the etherification. Preferably used products are those possessing methylolalkyl ether groups.

Component (B) can alternatively be prepared by simultaneous reaction of all of the reactants, including the alcohol component.

The stepwise procedure is preferred: (a) methylolation and benzyl ether formation and (b) etherification with an alcohol. Alcohols preferably used for the etherification are those referred to below as coupling solvents, and dialcohols, such as glycol, butane-1,4-diol and/or hexane-1,6-diol.

It is also possible to carry out the methylolation under alkaline conditions in the presence of $Ca^{++}$ and $Mg^{++}$ ions, and to subject the o-methylolphenol to further treatment after the addition of an acid.

The degree of etherification of the methylol groups of the methylene ether-containing components (B) can be varied as desired. Products possessing alkyl ether groups are preferably used.

Products which are to be mixed directly with the component (A) should preferably have a high degree of etherification and a low methylol content.

In binders prepared by a precondensation reaction of component (A) and component (B), the degree of etherification of the methylol groups can be lower. In this case, the methylol groups, which are undesirable in the end product, can be converted in a simple manner with basic NH groups, for example those of component (A), or monofunctional and difunctional amines at, for example, 50°-90° C.

The proportions of components (A) and (B) can vary greatly. In general, 55-95, preferably 60-80, % by weight of component (A) is combined with 5-45, preferably 20-40, % by weight of component (B).

In general, all salt-like catalysts are removed before component (B) is used in the novel binder. This is done in general by converting them to a water-insoluble or alcohol-insoluble form, eg. the phosphate or sulfate, and removing them by filtration. Alternatively, the salts may also be washed out. In some cases, it may be desirable for, for example, water-soluble Pb salts to be present in the novel coating agents.

Unconverted, residual phenols can be removed by purifying the etherified component (B) at 80°-130° C., preferably 90°-120° C., under reduced pressure in a thin film evaporator. In this process step, component (B) attains its final molecular weight, which depends on the temperature and residence time. The solids content of the resulting products is 85-95%, and the phenol content is <1% (cf. also German Patent Application No. P 34 22 510.2, O.Z. 0050/37175).

Condensate (B) can be prepared not only from phenol but, preferably, also from m-substituted phenols and mixtures of phenol with substituted phenols. Particularly suitable m-substituted phenols are Cardanol in combination with phenol, 10-30% of the former being employed. Cardanol is obtained from oil from cashew nut shells by distillation under reduced pressure, and essentially consists of 3-(8,11-pentadecadienyl)-phenol. Specific examples of further starting materials are the following phenols: 2,3-xylenol, 3,5-xylenol, monosubstituted and disubstituted isopropyl-, butyl-, amyl-, octyl- and dodecylphenols, olefinically unsaturated alkylphenols, such as allylphenols, butenylphenol and hexenylphenol, and bisphenol A. p-Substituted phenols are used only in minor amounts.

Regarding the functional groups of components (B), the phenol-phenol bonds preferably consist of 15-90% of methylene ether bridges and 10-85% of methylene bridges, 70-90% being in the o-position and 10-30% in the p-position.

The degree of etherification can correspond to, for example, 0.05-0.75 ether group per phenolic OH group, in the form of an alkoxymethyl ether or aralkoxymethyl ether.

The aqueous coating agents which have been rendered water-soluble or water-dispersible with carboxylic acids may furthermore contain pigments, coupling solvents, anti-oxidants and surfactants. The pigments are of the conventional type, one or more pigments such as iron oxide, lead oxides, strontium sulfate, carbon black, titanium dioxide, talc, barium sulfate, barium yellow ($BaCrO_4$), cadmium red (CdS or CdSe), chrome green or lead silicate being suitable. The weight ratio of pigment to binder employed can vary up to 1:1, preferably up to about 1:10. The baths may furthermore contain heavy metal ions, such as $Pb^{++}$, $Cu^{++}$, $Sn^{++}$, $Zn^{++}$, $Co^{++}$, $Zr^{++}$, in the form of their acetates, naphthenates or oleates, etc.

The abovementioned coupling solvents are water-soluble or partially water-soluble organic solvents for the resin components used according to the invention. Specific examples of such solvents are ethylene glycol monomethyl ether, ethylene glycol monoethyl ether, ethylene glycol monobutyl ether, ethylene glycol monohexyl ether, diethylene glycol monobutyl ether, ethanol, isopropanol and isobutanol. The coupling solvents are used in general in amounts of from 0 to 8% by weight, based on the total weight of the coating bath. The total solids content of the cationic electrocoating bath is kept at from about 5 to about 25, preferably from about 12 to about 22, % by weight, based on the total weight of the bath.

Curing of the novel coating agent can, if desired, be accelerated in a simple manner by incorporating sulfonate groups into the NH-containing epoxide/amine adduct, in an amount of from 0.05 to 3.0, preferably from 0.1 to 2.0, in particular from 0.2 to 1.0, % by weight, based on the total solids content of the binder.

To do this, the epoxide/amine adduct of component (A) is reacted with amidosulfonic acid. This reaction is carried out at 140°–180° C., ammonia being eliminated.

In order to ensure that the envisaged amounts of the catalytic sulfonate groups are incorporated into the binder, care should be taken to ensure that complete conversion takes place, ie. complete elimination of $NH_3$.

Preferably, the novel surface coating binders are employed in a form which is protonated with inorganic or organic acids, eg. phosphoric acid, preferably with water-soluble carboxylic acids, such as acetic acid, formic acid or lactic acid, and are applied onto the conventional metallic substrates, such as iron, steel, aluminum or copper, which may or may not have been pretreated, eg. phosphatized.

The cathodic surface coating formulations obtained from the protonated coating agents according to the invention can also be employed in a conventional manner by spraying, dipping, flooding, etc., and have a pH of 6.5–8.7, preferably 7.0–8.2, and a conductivity of 700–2,500, preferably 1,000–2,000, us.

In order to deposit the coating agent, a d.c. voltage of 200–500 V is applied for about 1–3 minutes. After bath material still adhering has been washed off, the film deposited cathodically on the electrically conductive article is cured at about 130°–175° C., preferably 140°–170° C., for 10–30 minutes.

After cathodic deposition, the novel coating agents give smooth, high-quality coatings which possess the good properties required for use as a primer. They possess excellent mechanical properties and very good corrosion resistance, for example in the salt spray test.

In the Examples which follow, parts and percentages are by weight.

Preparation of component (A)

1614.6 parts of a diglycidyl ether obtained from epichlorohydrin and bisphenol A and having an epoxide value of 0.5 and 403.0 parts of a resin of this type having an epoxide value of 0.2 are dissolved in 864.5 parts of toluene at 70° C.

2678.0 parts of this solution are metered into 869.2 parts of hexamethylenediamine at 70° C. in the course of 2.5 hours.

Some of the excess amine is removed at 150° C. under reduced pressure, and the concentrate is treated further in a thin film evaporator at 190° C. and under 0.3 mm Hg.

The product has a softening point of 70° C. and a total nitrogen content of 4.7%, 1.9% being attributable to primary amino groups, 2.6% to secondary amino groups and 0.2% to tertiary amino groups.

55.0 parts of a dimeric fatty acid (eg. ®Pripol 1014), 35.0 parts of stearic acid, 7 parts of triphenylphosphine, 80.0 parts of isodecanol and 25 parts of toluene are added to 400.0 parts of this adduct, and the mixture is heated at 100° C. 2.15 parts of amidosulfonic acid, dissolved in 5 parts of warm $H_2O$, are then added, and the mixture is heated at 160° C. for 1.5 hours, toluene, the water added, some of the water of reaction and, above 140° C., ammonia being removed. The mixture is kept at 170° C. until the viscosity has reached 1050 mPa.s, measured at 150° C. using an Epprecht viscometer. The acid number is 6.0. The mixture is diluted with a mixture of 75.0 parts of butylglycol, 75.0 parts of ethylglycol and 91.0 parts of ethanol.

The solids content of the resulting solution of component (A) is 60.5%, the amine number is 74 mg of KOH/g and the tertiary amine number is 4.8 mg of KOH/g.

Preparation of component (B)

716.5 parts of phenol, 1312.5 parts of 40% strength formalin (40% strength aqueous formaldehyde solution) and 33.3 parts of zinc acetate [$Zn(CH_3Coo)_2.2H_2O$] are heated at 70° C. in a reactor without metal parts, and are kept at this temperature until the exothermic reaction has abated. The mixture is then heated to 90° C. and kept at this temperature for 4 hours. 1250 parts of n-butanol and, after 2.5 hours, a further 46.0 parts of paraformaldehyde are added to this reaction solution, and water is separated off at from 80° to 83° C. until no more water passes over. 10 parts of $H_3PO_4$, dissolved in n-butanol, are then slowly metered in at from 50° to 60° C., the resulting zinc phosphate is removed by filtration, the solution is evaporated down at 60°–80° C. under reduced pressure, and the residue is further concentrated in a thin film evaporator at 120° C. and under 1–2 mbar. The solids content is about 90%. To adjust the viscosity to 1600 mPa.s at 75° C. (measured using an Epprecht viscometer), the product is treated further in a rotary evaporator at 100°–110° C. for about 4 hours. The final solids content of component (B) obtained in this manner is 93%.

Preparation and use of the novel coating agents 307.0 parts of the solution of component (A) described above are mixed with 83.0 parts of component (B) described above, and the mixture is diluted with 50.0 parts of isobutanol and stirred at 80° C. until the viscosity has reached 840 mPa.s, measured at 75° C. using an Epprecht viscometer.

The amine number is 52 mg of KOH/g, and the solids content is 60.6%.

To carry out electrocoating, 200.0 parts of the solid resin are protonated with 5.0 parts of acetic acid and diluted with fully demineralized water to a bath volume of 2000 parts. The pH of the bath is 7.0, and the conductivity is 1530 μs.

The bath is aged for 2 days, after which deposition is effected at 30° C. and 300 V for 2 minutes onto zinc phosphate-coated steel sheets connected as the cathode, and the coatings are baked for 20 minutes at 140° C. Impact-resistant coatings about 17 μm thick and having good corrosion protection properties are obtained.

We claim:

1. A heat-curable aqueous coating agent which contains, as a binder, a mixture or precondensate of
   (A) an epoxy resin/amine adduct which is modified by the amide forming reaction with mono- or dicarboxylic acids and which contains primary or secondary amino groups or mixtures thereof with an NH amine number of 20–150 mg of KOH/g and
   (B) a phenol resin with a phenol content of less than 1% based on a resole ether with phenol-phenol bonds, which are bonded via at least 15% o,o'-methylene ether groups and whose p-positions predominately carry hydrogen or methylolalkyl ether groups, or hydrogen and methylolalkyl ether groups, whose ether groups are prepared by using monoalcohols of 1 to 15 carbon atoms, polyhydric alcohols or mixtures thereof.

2. A coating agent as defined in claim 1, wherein the phenol-phenol bonds of component (B) consist of 15–90% of methylene ether bridges and 10–85% of methylene bridges, 70–90% being in the o-position and 10–30% in the p-position.

3. A coating agent as defined in claim 1, wherein component (B) possesses additional methylolalkyl ether groups in the p-position.

4. A coating agent as defined in claim 1, wherein component (B) is prepared from phenol and formaldehyde and, an aliphatic alcohol, at pH 4.0–7.0, in the presence of divalent metal ions.

5. A coating agent as claimed in claim 2, wherein component (B) is prepared from phenol and formaldehyde and, an aliphatic alcohol, at pH 4.0–7.0, in the presence of divalent metal ions.

6. A coating agent as defined in claim 1, wherein the binder consists of a mixture or precondensate of 55–95% by weight of component (A) and 5–45% by weight of component (B).

7. A heat-curable aqueous coating agent which contains, as a binder, a mixture of
   (A') a resin prepared from the diglycidyl ether of bisphenol A and hexamethylenediamine with additional amidation with a dimeric fatty acid and stearic acid and
   (B') a phenol resin based on a resol ether and prepared from phenol, formaldehyde, zinc acetate and N-butanol at elevated temperatures.

8. A coating agent as defined in claim 7, wherein component (B) is prepared by using polyhydric alcohols selected from the group consisting of glycol, diethylene glycol, triethylene glycol, butane-1,4-diol and hexane-1,6-diol and mixtures thereof.

* * * * *